June 18, 1968  J. W. McFARLAND ETAL  3,388,604
TRAVELING TARGET
Filed Feb. 1, 1966  2 Sheets-Sheet 1
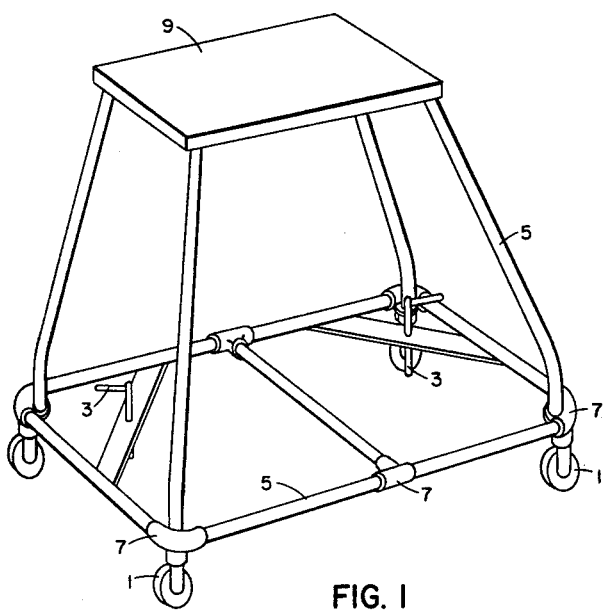
FIG. I
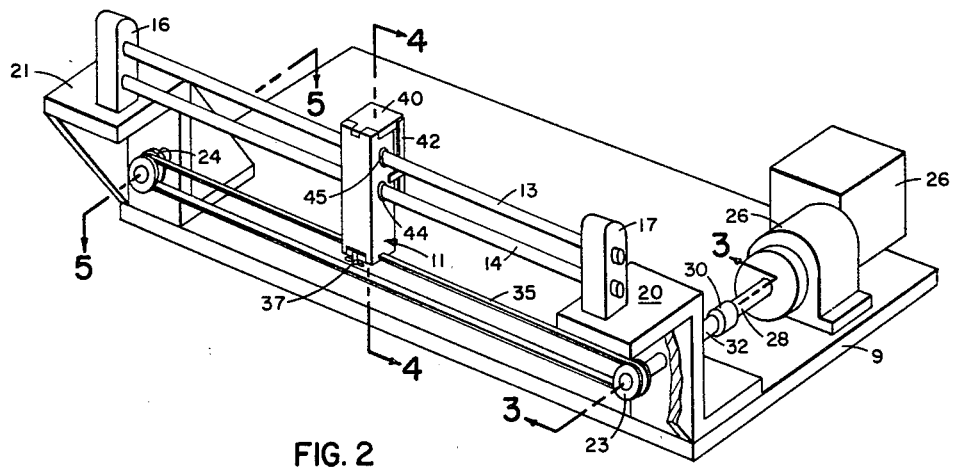
FIG. 2
John W. McFarland
Richard E. Lawson,
INVENTORS.
BY Harry M. Saragovitz
Edward J. Kelly
Herbert Berl
Robert E. Sims

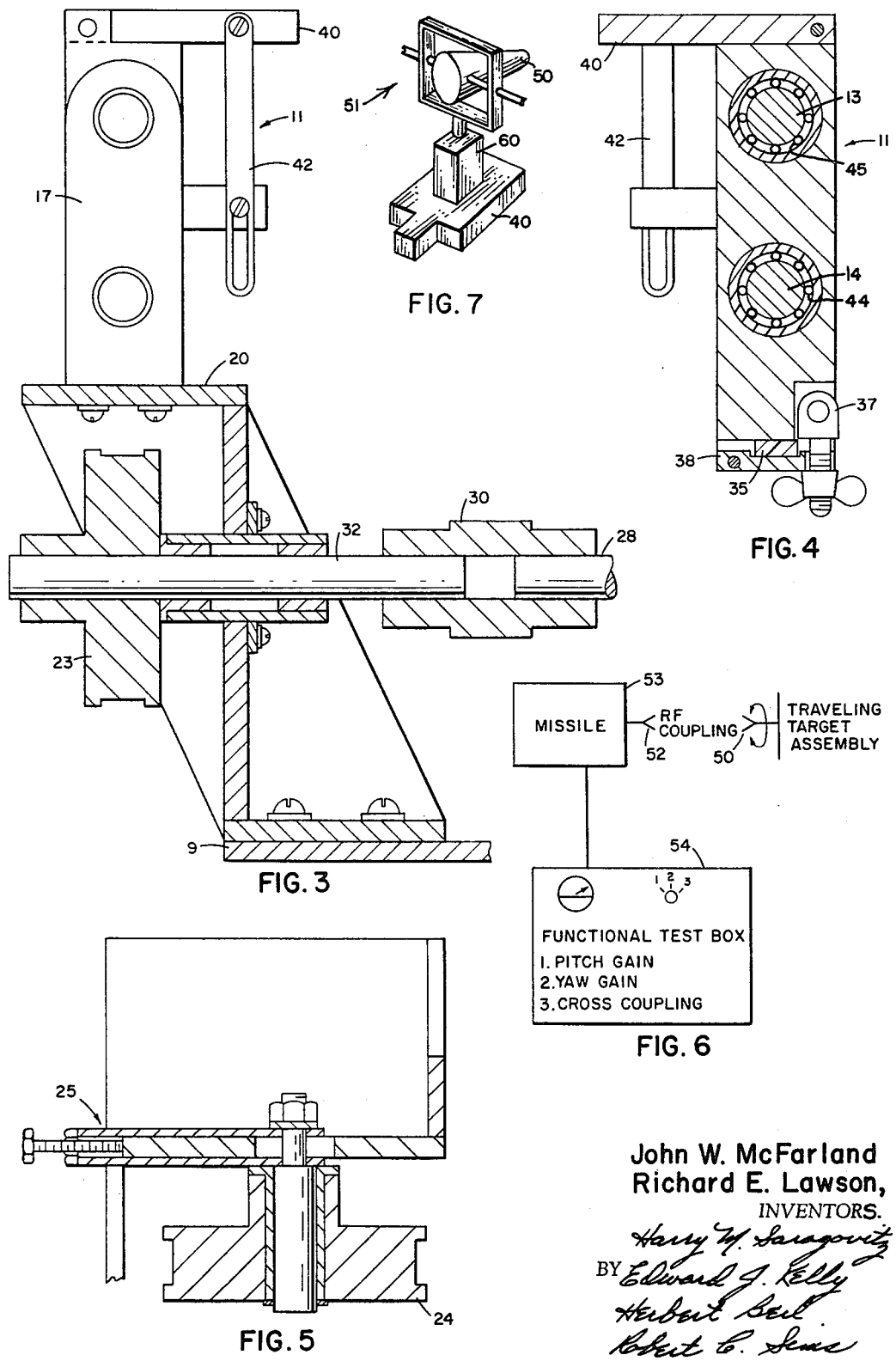

United States Patent Office 3,388,604
Patented June 18, 1968

3,388,604
TRAVELING TARGET
John W. McFarland, Lexington, and Richard E. Lawson, Arlington, Mass., assignors to the United States of America as represented by the Secretary of the Army
Filed Feb. 1, 1966, Ser. No. 524,357
8 Claims. (Cl. 74—89.22)

ABSTRACT OF THE DISCLOSURE

A traveling target device having a motor drive means which allows a target source to move smoothly at 1°/sec. over two rods for a desired distance and rate in either direction in the yaw and pitch planes of a missile so as to measure radar error voltages.

---

There is a need in the radar art for a traveling target which will introduce radar rates which allow radar error voltages to be measured in all planes. Also such a traveling target is needed in missile simulation. In order to test for pitch and yaw head gyro gains, pitch head, elevon radar gains, and cross-coupling, a target is required to travel smoothly at 1°/sec. for a desired distance and in a given direction. A carriage for the target is, therefore, needed that will perform the necessary operations on a target source.

It is an object of the present invention to provide a carriage device to cause a target to travel smoothly.

A further object of the present invention is to provide a traveling target device in which a motor drive means allows a target source to move over two rods.

A still further object of this invention is to provide a traveling target carriage device in which the target can be moved at 1°/sec. for a desired distance, rate, and direction.

The invention further resides in and is characterized by various novel features of construction, combinations, and arrangements of parts which are pointed out with particularity in the claims annexed to and forming a part of this specification. Complete understanding of the invention and an introduction to other objects and features not specifically mentioned will be apparent to those skilled in the art to which it pertains when reference is made to the following detailed description of a specific embodiment thereof and read in conjunction with the appended drawing. The drawing, which forms a part of the specification, presents the same reference characters to represent corresponding and like parts throughout the drawings, and wherein:

FIGURE 1 is a pictorial representation of a preferred embodiment of the dolly assembly supporting the present invention;

FIGURE 2 is a pictorial representation of a preferred embodiment of a carriage system in accordance with the present invention;

FIGURE 3 shows a side view partially in section of the invention taken along the section indicated by 3—3 on FIGURE 2;

FIGURE 4 is a sectional view of the carriage taken along the section lines 4—4 in FIGURE 2;

FIGURE 5 is a sectional view along the lines 5—5 in FIGURE 2 and showing the details of the structure of one structure of one pulley assembly;

FIGURE 6 is a schematic diagram illustrating a test set up for utilizing the present invention; and FIGURE 7 is a pictorial showing of the target mounted on the carriage top.

The first step in providing a target source which will move at a desired rate and direction is to provide a dolly assembly so as to bring the target source to the receiver to be tested. FIGURE 1 shows just such a dolly. Caster wheels 1 are provided to roll the dolly assembly, and jacks 3 are provided to lock the assembly in place. The frame 5 is fitted together by NU Rail fittings 7. The frame is made of aluminum pipe. An aluminum plate 9 forms the top of the dolly assemby. Plate 9 is welded to the frame.

Referring to FIGURES 2 and 3, there is shown a carriage 11 (shown in section in FIGURE 4) which rides on two rods 13 and 14 as shown in the drawing. The target will be mounted on the carriage in any conventional manner. The rods are held by rod supporters 16 and 17. The supporters are held in place by brackets 20 and 21. Brackets 20 and 21 are secured to plate 9 by screws. Brackets 20 and 21 also provide support for pulleys 23 and 24 as shown in the drawing. FIGURE 5 shows that pulley 24 has an adjustable support 25 on its bracket. A motor and gearing assembly 26 is provided to drive pulley 23 by way of shaft 28, coupler 30, and shaft 32. The motor assembly is mounted on plate 9 in any conventional manner. The pulley 23 drives a belt 35 which is connected between the two pulleys. Belt 35 drives carriage 11. The connections of the belt to the carriage may best be seen in FIGURE 4. A swing bolt 37 and a hinged pressure jaw 38 are provided as shown to lock the carriage to the belt.

The carriage is provided with a hinged top 40. Hinged top 40 can be adjusted and locked in position by adjusting strap 42 as shown in the drawing. Carriage 11 has ball bushings 44 and 45 (best seen in FIGURE 4) so as to allow smooth riding along rods 13 and 14. By having two rods, the carriage is prevented from rotating in any direction, and, of course, can travel only in the direction of the rods. The motor assembly is selected so as to be able to move carriage 11 at any desired speed. The carriage, plate, and dolly are all made of aluminum.

FIGURE 6 shows the test set up using the traveling target. The target source 50 is mounted on the carriage top 40 by conventional mounting means 60 so that it can rotate 360° as shown in FIGURE 7. Source 50, typically, is provided with a gimballing mechanism, generally designated by the numeral 51, which is connected to a conventional drive mechanism (not shown) for desired rotation of the horn. The dolly positions the source so that its direction of travel (the direction of the rods) is in the desired line with respect to the receiver horn 52 of the equipment to be tested. The equipment may be any radar system such as that in a self guided missile 53. A functional test box 54 is provided to measure and record the results of the test. A typical test procedure for a radar receiver is as follows:

TEST 1

Function: Pitch and Yaw Head Gyro Gains

Step 1a.—Move target horn 50 in the yaw plane of missile 53 at 1°/sec. Measure yaw gyro comparator output as horn travels through the approximate center of the −3° and +3° points.

Step 1b.—Rotate missile receiver and horn assembly 52–53 in a 270° position. Move target horn in the pitch plane of the missile at 1°/sec. and repeat as in Step 1a.

TEST 2

Function: Pitch Head, Elevon Radar Gains and Cross Coupling

Step 1a.—With missile in 270° position, move target horn 50 to the right 1° from Boresight of the missile. Check the spin reference for minimum cross-coupling at the yaw head radar comparator. Move horn 1° left from Boresight and repeat checks.

Step 1b.—Move target horn to the right 1° so as to simulate 1° up from Boresight and then to the left 1° to simulate 1° down from Boresight. Measure head radar error voltages and head yaw cross-coupling. Measure elevon radar error voltage and yaw cross-coupling voltages.

TEST 3

Function: Pitch CCM Radar Gain

Step 1a.—Move the target horn ±1° from Boresight in the pitch plane. Measure head pitch radar gain. Measure elevon radar gains.

TEST 4

Function: Yaw CCM Radar Gain

Step 1a.—Same as Test 3 except in yaw plane.

TEST 5

Function: Yaw Head, Elevon Radar Gains, and Cross-Coupling

Step 1a.—Same as Test 2 except in yaw plane.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated. It will be apparent to those skilled in the art that changes may be made in the form of the apparatus disclosed without departing from the spirit of the invention as set forth in the disclosure, and that in some cases certain features of the invention may sometimes be used to advantage without a corresponding use of other features. It is, therefore, to be understood that within the scope of the appended claims, the invention may be practiced otherwise than as specifically described. Accordingly, it is desired that the scope of the invention be limited only by the appended claims.

We claim:

1. An apparatus comprising first and second rods supported in parallel spaced relationship by support means; motor means mounted on said support means; carriage means slidably mounted on said rods so as to be able to move only in the direction the rods are aligned, said carriage means having an adjustable hinged top; and drive linkage connected between said motor means and said carriage means so as to allow said motor to move said carriage, said drive linkage comprising first and second pulley means mounted in spaced relationship on said support means, a belt means connected between said first and second pulley means, shaft means connected between said motor and said first pulley means so as to cause movement of said belt, and, means fastening said belt to said carriage means.

2. An apparatus as set forth in claim 1, further comprising a target source mounted on said carriage means so as to be moved thereby.

3. An apparatus as set forth in claim 1, wherein said carriage means is mounted on said rods by first and second ball bushing means.

4. An apparatus as set forth in claim 2, further comprising a dolly means adapted to carry said support means.

5. An apparatus comprising first and second rods supported in parallel spaced relationship by support means; motor means mounted on said support means; carriage means slidably mounted on said rods so as to be able to move only in the direction the rods are aligned, said carriage means being mounted on said rods by first and second ball bushing means; drive linkage connected between said motor means and said carriage means so as to allow said motor to move said carriage, said drive linkage comprising first and second pulley means mounted in spaced relationship on said support means, a belt means connected between said first and second pulley means, shaft means connected between said motor and said first pulley means so as to cause movement of said belt, and, means fastening said belt to said carriage means.

6. An apparatus as set forth in claim 5, wherein said means fastening said belt to said carriage comprises a swing bolt and a hinged pressure jaw operating together.

7. An apparatus as set forth in claim 6, wherein said carriage has an adjustable hinged top.

8. An apparatus as set forth in claim 7, further comprising a target source mounted on said carriage means so as to be positioned thereby.

References Cited

UNITED STATES PATENTS

| | | | |
|---|---|---|---|
| 2,884,788 | 5/1959 | Clark | 74—89.22 |
| 3,090,135 | 5/1963 | Eisenberg | 35—10.4 |
| 3,254,340 | 5/1966 | Sealander | 343—17.7 |

FRED C. MATTERN, Jr., *Primary Examiner.*

W. S. RATLIFF, *Assistant Examiner.*